(12) United States Patent (10) Patent No.: US 9,162,378 B1
Spell (45) Date of Patent: Oct. 20, 2015

(54) SOAP CONSOLIDATION ASSEMBLY

(71) Applicant: Mark L. Spell, Wake Forest, NC (US)

(72) Inventor: Mark L. Spell, Wake Forest, NC (US)

( * ) Notice: Subject to any disclaimer, the term of this patent is extended or adjusted under 35 U.S.C. 154(b) by 368 days.

(21) Appl. No.: 13/692,315

(22) Filed: Dec. 3, 2012

(51) Int. Cl.
| | |
|---|---|
| B29C 39/38 | (2006.01) |
| B29C 43/52 | (2006.01) |
| B29C 51/08 | (2006.01) |
| B29C 33/20 | (2006.01) |
| B28B 7/00 | (2006.01) |

(52) U.S. Cl.
CPC ............... *B29C 39/38* (2013.01); *B28B 7/0044* (2013.01); *B29C 43/52* (2013.01); *B29C 51/087* (2013.01); *B29C 2033/207* (2013.01)

(58) Field of Classification Search
CPC .. B29C 39/38; B29C 33/08; B29C 2033/207; B29C 41/46; B29C 41/52; B29C 51/082; B29C 51/087; B29C 43/52; B29C 67/241; A61C 13/20; C11D 13/16; C11D 13/20; C11D 13/26
USPC ......... 425/110, 117, 125, 143, 144, 160, 170, 425/318, 441, 442, 438, 447–448, 472; 249/78, 120, 121, 170, 171, 172; 264/322, 330
See application file for complete search history.

(56) References Cited

U.S. PATENT DOCUMENTS

| | | | |
|---|---|---|---|
| D190,405 S | 5/1961 | Barnes | |
| 3,148,430 A | 9/1964 | Hanner | |
| 3,779,681 A * | 12/1973 | Kinney et al. .................. | 425/160 |
| 3,931,035 A | 1/1976 | Brown | |
| 4,054,086 A * | 10/1977 | McNair ............................ | 99/374 |
| 4,161,837 A * | 7/1979 | Johnston ............................. | 43/4 |
| 4,188,009 A * | 2/1980 | Gillespie .......................... | 249/78 |
| 4,296,064 A * | 10/1981 | Satcher ........................... | 264/322 |
| 4,307,287 A * | 12/1981 | Weiss ............................. | 219/442 |
| 4,563,573 A * | 1/1986 | Hartelius et al. ............... | 219/405 |
| 4,917,589 A | 4/1990 | Manderson | |
| 4,946,638 A * | 8/1990 | Takamatsu ..................... | 264/302 |
| 5,004,894 A * | 4/1991 | Whitehead .................... | 219/521 |
| 5,248,870 A * | 9/1993 | Redal ............................. | 219/521 |
| 5,453,000 A * | 9/1995 | Lebensfeld ................... | 425/152 |
| 5,560,940 A * | 10/1996 | Breuil ........................... | 425/151 |
| 5,731,537 A * | 3/1998 | Sassaman ........................ | 86/24 |
| 5,788,873 A * | 8/1998 | Warsaw ........................ | 249/170 |
| 5,811,138 A * | 9/1998 | Yelvington ................... | 425/384 |
| 5,832,818 A * | 11/1998 | Menzak, Jr. .................... | 100/92 |
| D412,948 S * | 8/1999 | Rosen ........................... | D21/528 |
| 5,954,115 A * | 9/1999 | Lebensfeld et al. .......... | 164/152 |
| 6,392,200 B1 * | 5/2002 | Nakamura et al. ............ | 219/386 |
| 6,457,962 B1 * | 10/2002 | Elmore ......................... | 425/110 |
| 6,459,073 B1 | 10/2002 | Berger | |
| 6,759,636 B2 * | 7/2004 | Stutman ........................ | 219/679 |
| 6,902,387 B2 * | 6/2005 | Cziraky ........................ | 425/144 |
| 6,905,014 B2 * | 6/2005 | Eldin ............................ | 206/0.84 |

(Continued)

FOREIGN PATENT DOCUMENTS

DE 3805335 A1 * 8/1989 ............. C11D 13/16

*Primary Examiner* — James Sanders
*Assistant Examiner* — Leith S Shafi

(57) ABSTRACT

A soap consolidation assembly includes a mold that may receive fragments of soap. A housing is provided that may insertably receive the mold. A heating element is coupled to the housing so the heating element may heat the mold. A processor is coupled to the housing and the processor is operationally coupled to the heating element. An actuator is coupled to the housing. The actuator is operationally coupled to the processor so the actuator may selectively actuate the processor.

11 Claims, 5 Drawing Sheets

(56) References Cited

U.S. PATENT DOCUMENTS

| | | | |
|---|---|---|---|
| 6,976,371 B2 * | 12/2005 | Gleason et al. | 62/457.9 |
| 7,052,261 B2 * | 5/2006 | Fernandez et al. | 425/136 |
| 7,137,335 B2 * | 11/2006 | Walker et al. | 100/92 |
| 7,967,595 B1 * | 6/2011 | Schofield et al. | 425/384 |
| 8,529,239 B1 * | 9/2013 | Black, Jr. | 425/144 |
| 2005/0008729 A1 * | 1/2005 | Fernandez et al. | 425/256 |
| 2005/0145633 A1 * | 7/2005 | Goto et al. | 220/573.4 |
| 2006/0289427 A1 * | 12/2006 | Tidey | 219/386 |
| 2007/0077326 A1 * | 4/2007 | Smith | 425/407 |
| 2011/0192830 A1 * | 8/2011 | Wilson | 219/386 |

* cited by examiner

SOAP CONSOLIDATION ASSEMBLY

BACKGROUND OF THE DISCLOSURE

1. Field of the Disclosure

The disclosure relates to soap consolidation devices and more particularly pertains to a new soap consolidation device for consolidating fragments of soap into a single bar of soap.

2. Summary of the Disclosure

An embodiment of the disclosure meets the needs presented above by generally comprising a mold that may receive fragments of soap. A housing is provided that may insertably receive the mold. A heating element is coupled to the housing so the heating element may heat the mold. A processor is coupled to the housing and the processor is operationally coupled to the heating element. An actuator is coupled to the housing. The actuator is operationally coupled to the processor so the actuator may selectively actuate the processor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
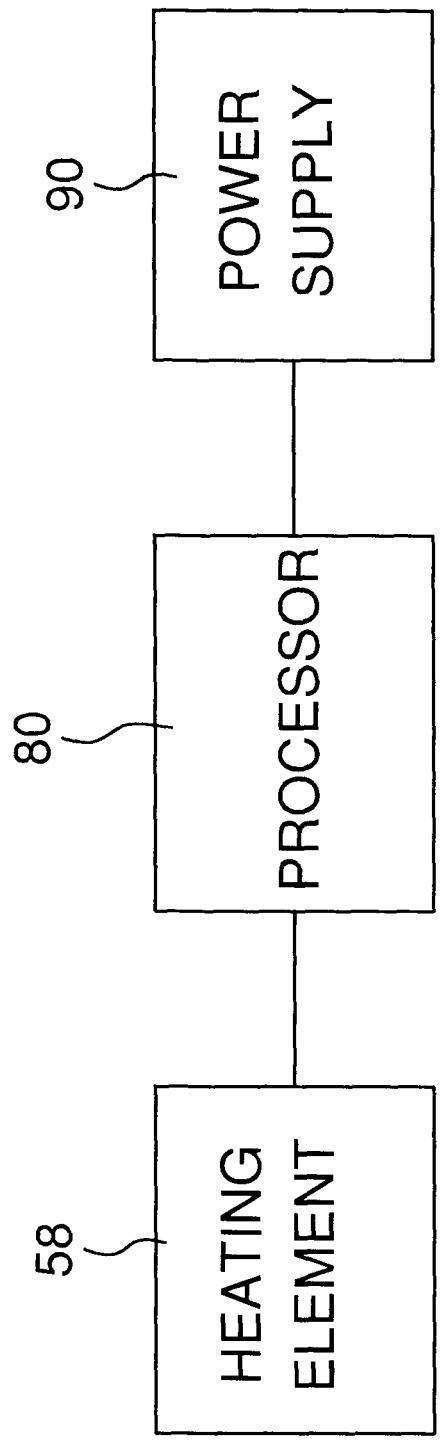
FIG. 1 is a schematic view of a soap consolidation assembly according to an embodiment of the disclosure.
Figure 2:
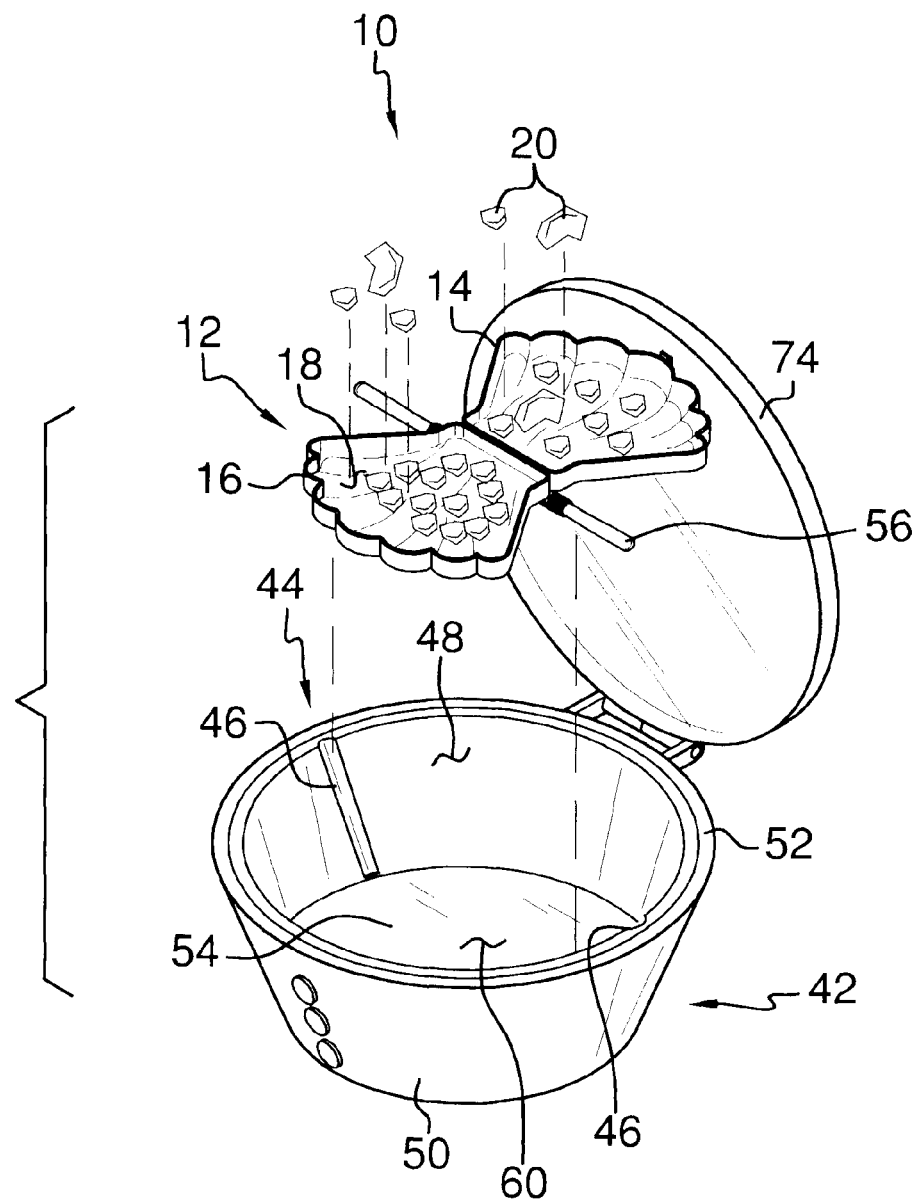
FIG. 2 is a perspective view of an embodiment of the disclosure.
Figure 3:
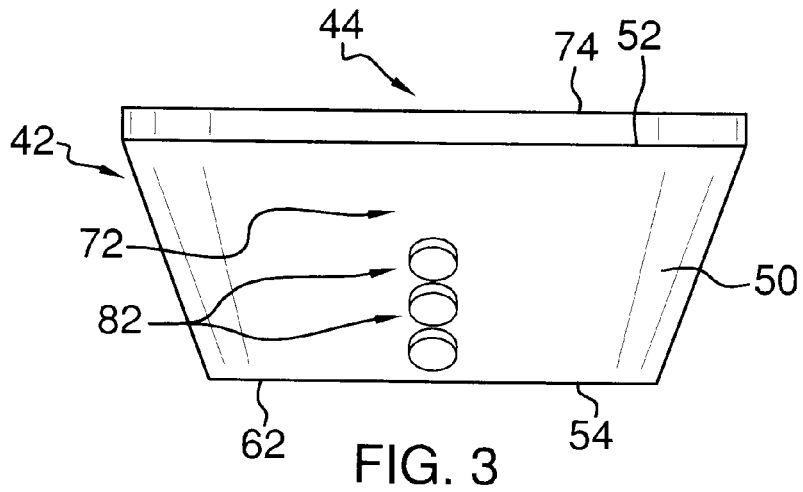
FIG. 3 is a front view of an embodiment of the disclosure.
Figure 4:
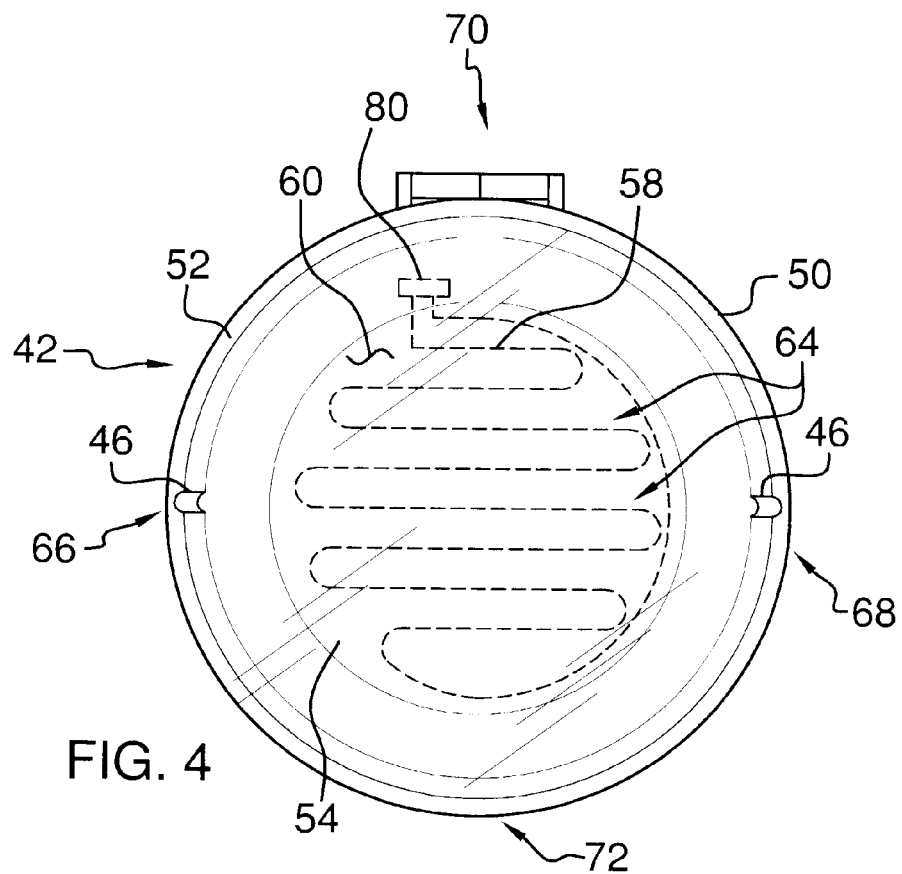
FIG. 4 is a top view of an embodiment of the disclosure.
Figure 5:
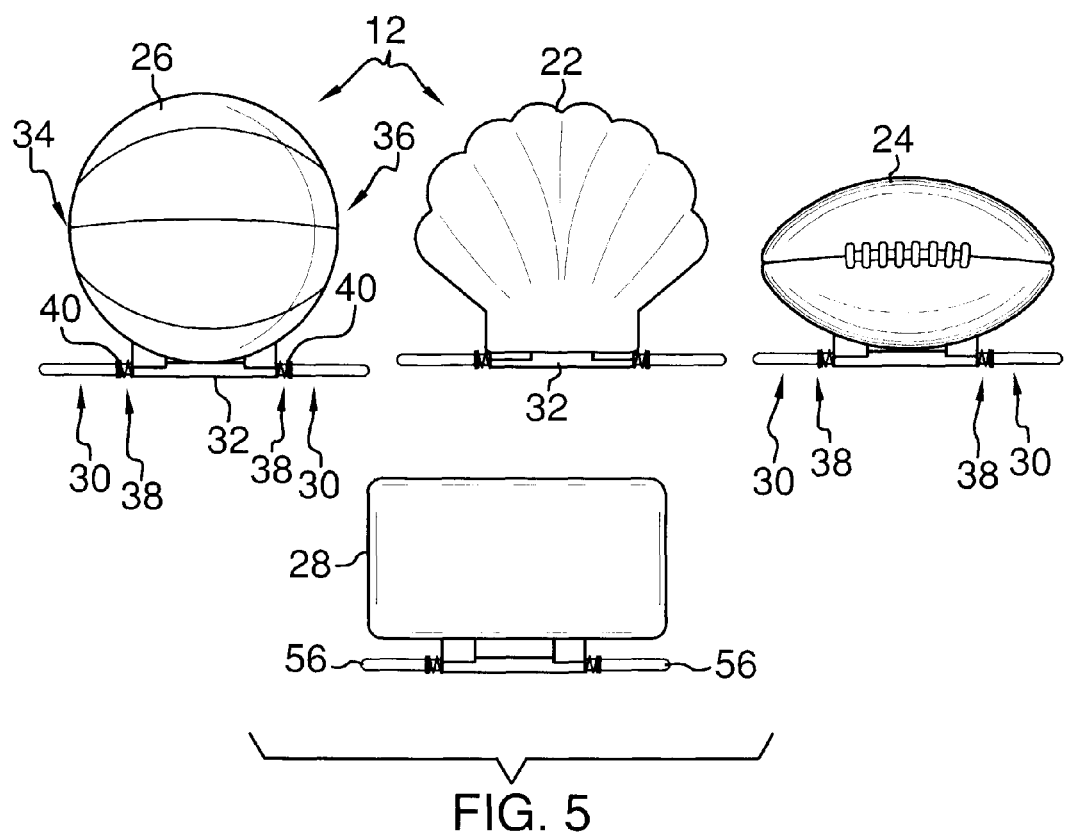
FIG. 5 is a side perspective view of an embodiment of the disclosure.
Figure 6:
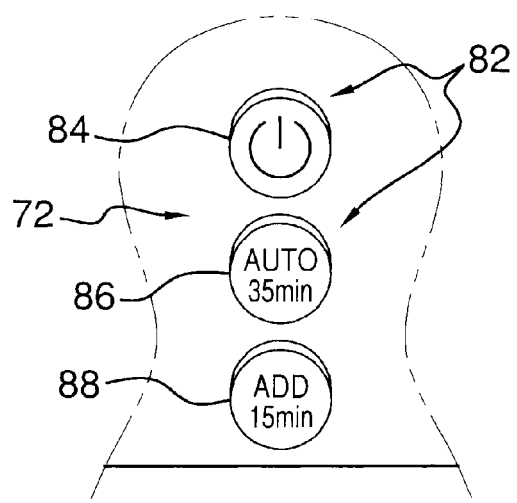
FIG. 6 is a front perspective view of an embodiment of the disclosure.
Figure 7:
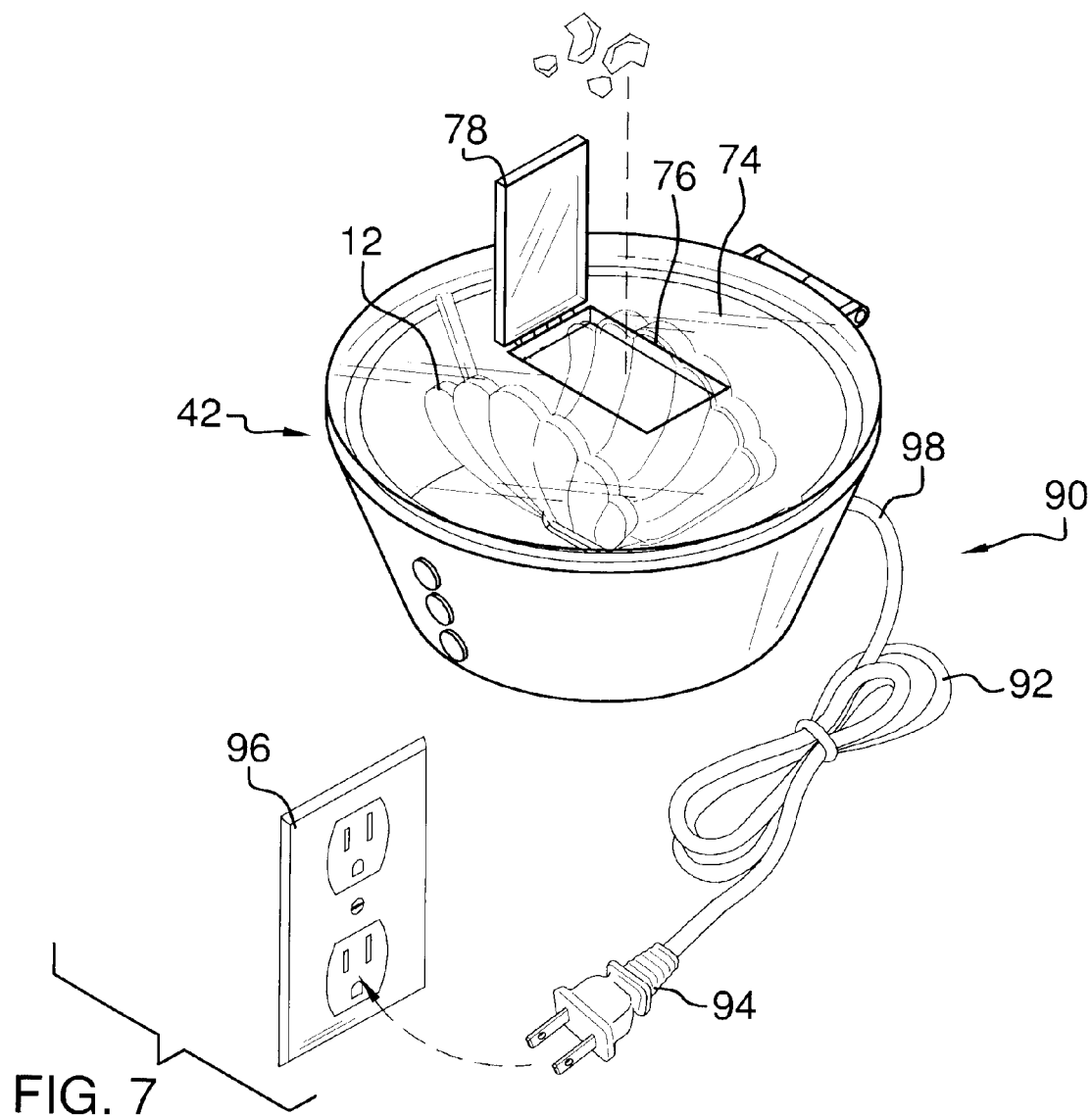
FIG. 7 is a top perspective view of an embodiment of the disclosure.

With reference now to the drawings, and in particular to FIGS. 1 through 7 thereof, a new soap consolidation device embodying the principles and concepts of an embodiment of the disclosure and generally designated by the reference numeral 10 will be described.

As best illustrated in FIGS. 1 through 7, the soap consolidation assembly 10 generally comprises a mold 12 comprising a first portion 14 hingedly coupled to a second portion 16. The mold 12 is positionable in an open position exposing an inner surface 18 of the mold 12 so the mold may receive fragments of soap 20. The mold 12 is positionable in a closed position concealing the inner surface 18 of the mold 12 so the mold 12 may contain the fragments of soap 20. The mold 12 may be one of a plurality of molds 12. Each of the plurality of molds 12 may have a plurality of shapes. Additionally, the plurality of shapes may comprise a sea shell 22, a football 24, a basketball 26, a rectangle 28 or other various shapes.

A peg 30 is slidably coupled to the mold 12 so the peg 30 extends laterally away from a hinged portion 32 of the mold 12. The peg 30 is one of a pair of pegs 30 each positioned proximate a first lateral side 34 and a second lateral side 36 of the hinged portion 32 of the mold 12. The peg 30 may have a length between 1.3 cm and 2.5 cm. A biasing member 38 is positioned on the peg 30 so the biasing member 38 biases the peg 30 outwardly from the hinged portion 32 of the mold 12. The biasing member 38 is one of a pair of biasing members 38 each positioned on an associated one of the pair of pegs 30. The biasing member 38 may comprise a spring 40.

A housing 42 is provided that has an open top 44 so the housing 42 may insertably receive the mold 12. The housing 42 may have a height between 9 cm and 13 cm. Additionally, the housing 42 may have an oval shape with a width between 10 cm and 13 cm and a length between 13 cm and 18 cm. A groove 46 extends into an inside surface 48 of an exterior wall 50 of the housing 42 so the groove 46 extends between a top edge 52 of the housing 42 and a bottom wall 54 of the housing 42. The groove 46 is one of a pair of the grooves 46 each positioned on opposite sides of the inside surface 48 of the exterior wall 50 of the housing 42. Each of the pair of grooves 46 may insertably receive a free end 56 of an associated one of the pair of pegs 30 so the pair of grooves 46 may retain the mold 12 within an interior of the housing 42.

A heating element 58 is positioned between a top surface 60 and a bottom surface 62 of the bottom wall 54 of the housing 42 so the heating element 58 may heat the mold 12. The heating element 58 heats the mold 12 so the fragments of soap 20 may melt and coalesce. In addition, the heating element 58 comprises a plurality of spaced loops 64 each extending between a first lateral side 66 and a second lateral side 68 of the housing 42. The spaced loops 64 are evenly distributed between a rear side 70 and a front side 72 of the housing 42. The heating element 58 may have an operational temperature sufficient to melt the fragments of soap 20. Additionally, the heating element 58 may have an operational voltage between 110 and 120 Volts AC.

A lid 74 is hingedly coupled to the top edge 52 of the housing 42 so the lid 74 may selectively close the open top 44 of the housing 42. An opening 76 extends through the lid 74 to access the interior of the housing 42 when the lid 74 is closed. The soap fragments 20 may be delivered to the interior of the housing 42 through the opening 76. A flap 78 is hingedly coupled to the lid 74 so the flap 78 may close the opening 76.

A processor 80 is coupled to the housing 42. The processor 80 is electrically coupled to the heating element 58 so the processor 80 may actuate the heating element 58 for a predetermined amount of time. An actuator 82 is coupled to the exterior wall 50 of the housing 42 and the actuator 82 is positioned on the front side 72 of the housing 42. The actuator 82 is electrically coupled to the processor 80 so the actuator 82 may selectively actuate the processor 80. The actuator 82 is one of a plurality of actuators 82 that are vertically spaced apart on the exterior wall 50 of the housing 42. The plurality of actuators 82 comprises an on/off actuator 84, an automatic timer actuator 86 and an additional time actuator 88.

A power supply 90 is coupled to the housing 42. The power supply 90 is electrically coupled to the heating element 58. The power supply 90 comprises a cord 92 comprising a first end 94 that may be electrically coupled to an electrical outlet 96. A second end 98 of the cord 92 is electrically coupled to the heating element 58.

In use, the fragments of soap 20 may be positioned within the mold 12 in order to combine the fragments of soap 20. The mold 12 may be positioned within the housing 42 so the mold 12 abuts the bottom wall 54 of the housing 42. The on/off actuator 84 may be actuated to actuate the processor. The automatic timer actuator 86 may be actuated to begin a thirty five minute heating cycle. If the soap fragments 20 have not fully coalesced after the thirty five minute heating cycle, the additional time actuator 88 may be actuated to continue the heating cycle for an additional fifteen minutes.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A soap consolidation assembly comprising:
    a mold configured to receive fragments of soap, said mold comprising a first portion of said mold hingedly coupled to a second portion of said mold defining a hinged portion of said mold wherein said mold is positionable in an open position exposing an inner surface of said mold and a closed position concealing said inner surface of said mold;
    a housing insertably receiving said mold;
    a heating element coupled to said housing wherein said heating element heats said mold;
    a processor coupled to said housing, said processor being operationally coupled to said heating element wherein said processor activates said heating element;
    an actuator coupled to said housing, said actuator being operationally coupled to said processor wherein said actuator actuates said processor;
    a peg slidably coupled to said mold wherein said peg extends laterally away from said hinged portion of said mold, wherein said peg is separate from said hinged portion; and a groove extending into an inside surface of an exterior wall of said housing wherein said groove extends between a top edge of said housing and a bottom wall of said housing, wherein the peg insertably engages the groove in the housing.

2. The assembly according to claim 1, further comprising a biasing member positioned on said peg wherein said biasing member biases said peg outwardly from said hinged portion of said mold.

3. The assembly according to claim 1, further comprising said peg being one of a pair of pegs, each of said pair of pegs being positioned respectively proximate a first lateral side and a second lateral side of said hinged portion of said mold.

4. The assembly according to claim 2, further comprising:
    said peg being one of a pair of pegs, each of said pair of pegs being positioned respectively proximate a first lateral side and a second lateral side of said hinged portion of said mold; and
    said biasing member being one of a pair of said biasing members, each of said pair of biasing members being positioned on an associated one of said pair of pegs.

5. The assembly according to claim 1, further comprising said groove being one of a pair of grooves, each of said pair of grooves being positioned on opposite sides of said inside surface of said exterior wall of said housing.

6. The assembly according to claim 5, further comprising:
    said peg being one of a pair of pegs, each of said pair of pegs being positioned respectively proximate a first lateral side and a second lateral side of said hinged portion of said mold; and
    each of said pair of grooves insertably receiving a free end of a respective one of said pair of pegs wherein said pair of grooves retains said mold within an interior of said housing.

7. The assembly according to claim 1, further comprising said heating element being positioned between a top surface and a bottom surface of a bottom wall of said housing.

8. The assembly according to claim 7, further comprising said heating element comprising a plurality of spaced loops each extending between a first lateral side and a second lateral side of said housing.

9. The assembly according to claim 1, further comprising a lid hingedly coupled to a top edge of said housing wherein said lid closes an open top of said housing.

10. The assembly according to claim 1, further comprising:
    a power supply coupled to said housing;
    said power supply being electrically coupled to said heating element; and
    said power supply comprising a cord comprising a first end configured to be electrically coupled to an electrical outlet.

11. A soap consolidation assembly comprising:
    a mold comprising a first portion of said mold being hingedly coupled to a second portion of said mold defining a hinged portion of said mold wherein said mold is positionable in an open position exposing an inner surface of said mold wherein said mold is configured to receive fragments of soap and a closed position concealing said inner surface of said mold wherein said mold is configured to contain the fragments of soap;
    a pair of pegs slidably coupled to said mold wherein each said peg extends laterally away from said hinged portion of said mold, each said peg being respectively positioned proximate a first lateral side and a second lateral side of said hinged portion of said mold;
    a pair of biasing members, each said biasing member being positioned on an associated one of said pegs wherein said biasing member biases said associated peg outwardly from said hinged portion of said mold;
    a housing having an open top wherein said housing insertably receives said mold;
    a pair of grooves, each said groove extending into an inside surface of an exterior wall of said housing wherein each said groove extends between a top edge of said housing and a bottom wall of said housing, each said groove being positioned on opposite sides of said inside surface of said exterior wall of said housing, each of said pair of grooves insertably receiving a free end of a respective one of said pair of pegs wherein said pair of grooves retains said mold within an interior of said housing;

a heating element positioned between a top surface and a bottom surface of said bottom wall of said housing wherein said heating element heats said mold, said heating element comprising a plurality of spaced loops each extending between a first lateral side and a second lateral side of said housing;

a lid hingedly coupled to said top edge of said housing wherein said lid closes said open top of said housing;

a processor coupled to said housing, said processor being electrically coupled to said heating element wherein said processor actuates said heating element;

an actuator coupled to said exterior wall of said housing wherein said actuator is positioned on said front side of said housing, said actuator being electrically coupled to said processor wherein said actuator; and a power supply coupled to said housing, said power supply being electrically coupled to said heating element, said power supply comprising a cord comprising a first end configured to be electrically coupled to an electrical outlet.

* * * * *